UNITED STATES PATENT OFFICE.

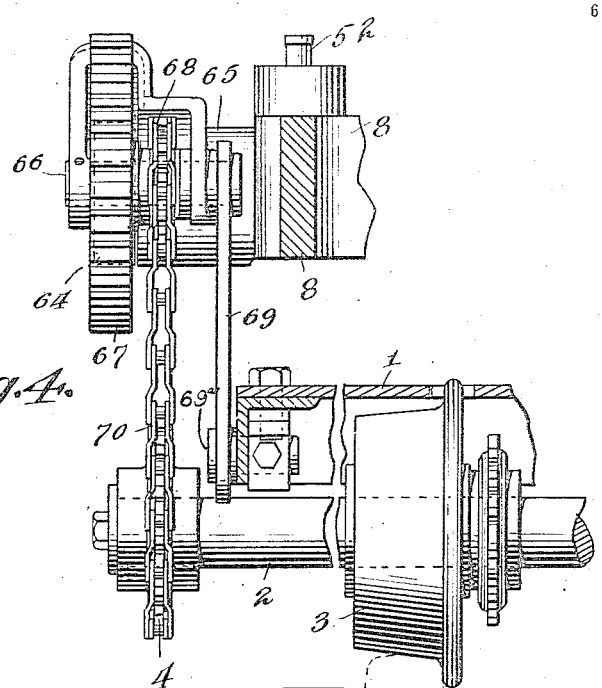
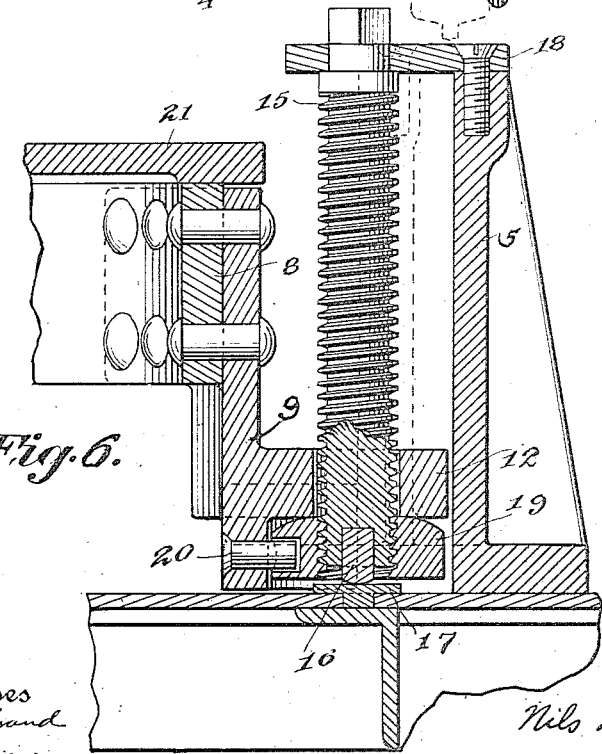

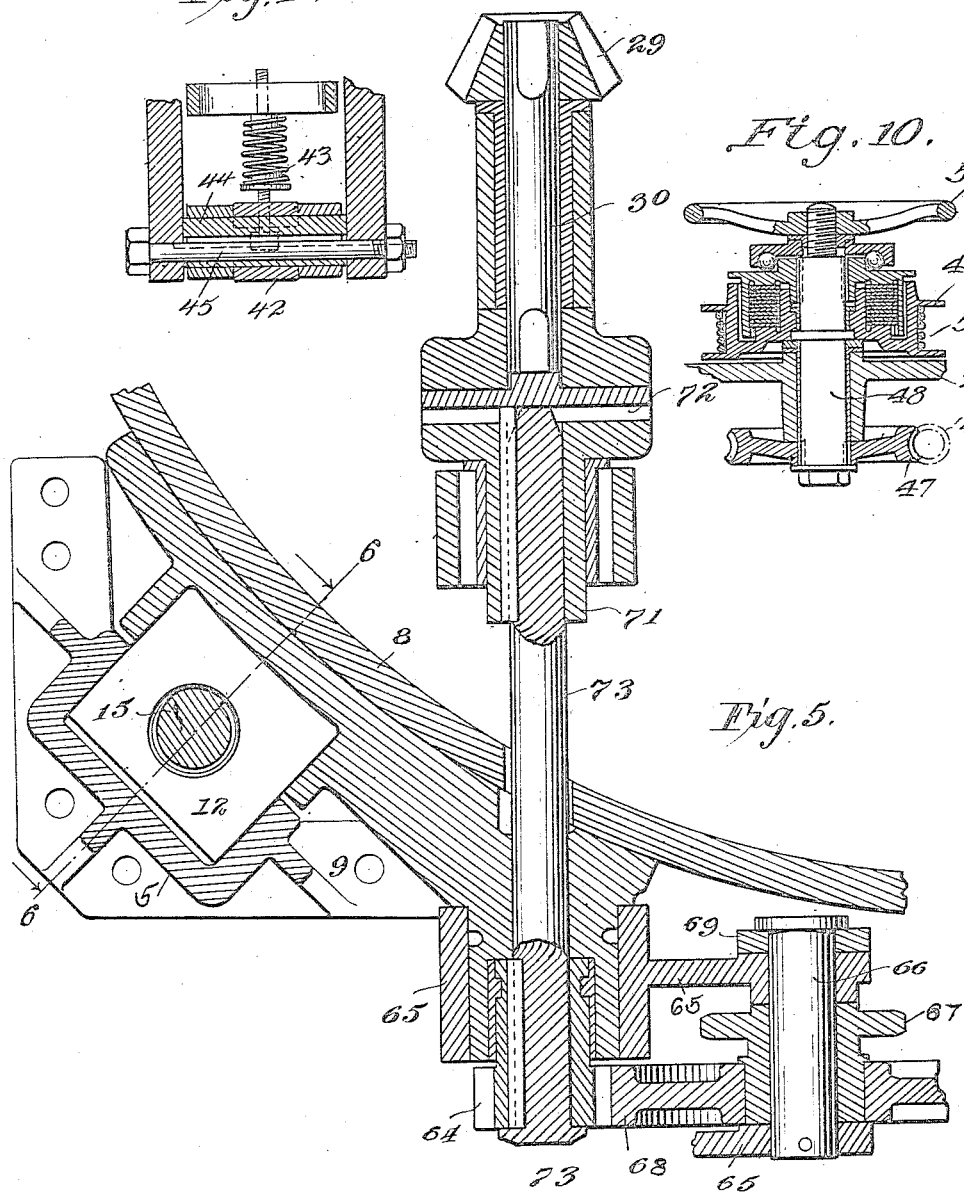

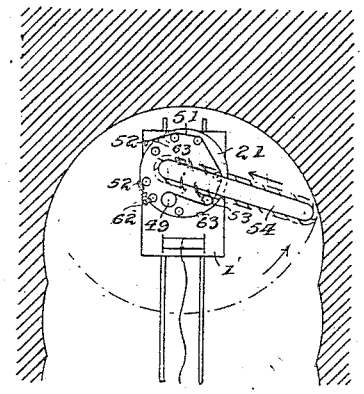
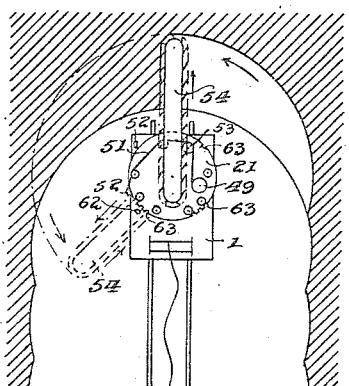
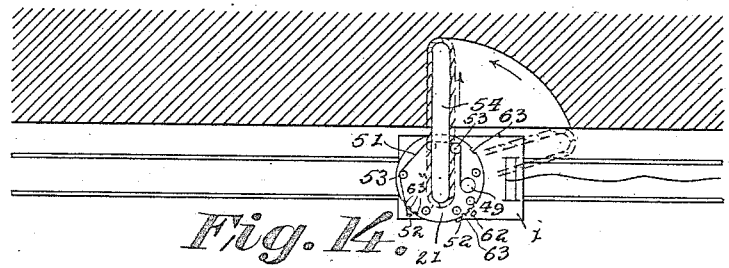
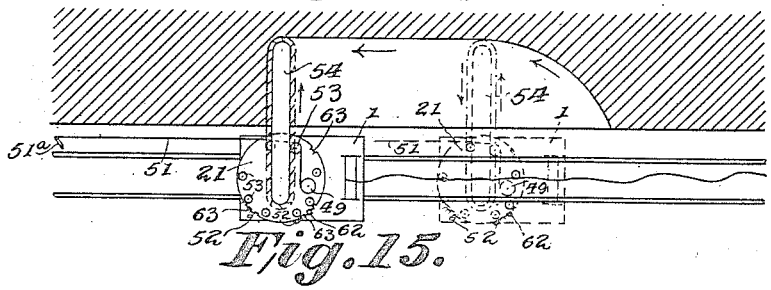

NILS DAVID LEVIN, OF COLUMBUS, OHIO, ASSIGNOR TO THE JEFFREY MANUFACTURING COMPANY, A CORPORATION OF OHIO.

MINING-MACHINE.

1,285,254.  Specification of Letters Patent.  Patented Nov. 19, 1918.

Application filed September 30, 1911, Serial No. 652,099. Renewed October 27, 1917. Serial No. 198,882.

*To all whom it may concern:*

Be it known that I, NILS D. LEVIN, a citizen of the United States, residing at Columbus, in the county of Franklin and State of Ohio, have invented certain new and useful Improvements in Mining-Machines, of which the following is a specification, reference being had therein to the accompanying drawing.

This invention relates to coal cutting machines, and more especially to machines of the type disclosed in my co-pending application, Serial No. 545,337, filed February 23, 1910.

The principal object of the invention is to provide in a machine of the type disclosed in my co-pending application, above referred to, an improved driving connection between the main motor and the truck wheels.

I do not herein claim as a part of my present invention the specific devices which I have shown for adjusting the cutter mechanism vertically with respect to the base and for holding it in adjusted position. These devices are shown and claimed in my co-pending application, Serial No. 752,742, filed March 7, 1913, as a division of this application.

In the accompanying drawings I have shown the embodiment of my invention which is now deemed preferable. The construction illustrated is similar in many respects to that shown in my co-pending application, Serial No. 545,337.

Of the drawings,

Fig. 4 is a fragmentary end view of the power connection between the adjustable frame and the truck.

Fig. 5 is a cross sectional view taken along the line 5—5 of Fig. 2, many of the parts connected to the turntable being omitted for the sake of clearness.

Fig. 6 is a fragmentary cross sectional elevation taken along the line 6—6 of Fig. 5.

Fig. 8 is a detail view of the pins connecting together the elements of the cutter mechanism drive.

Fig. 9 is a fragmentary cross sectional view showing the means for retaining the turntable in place upon its support.

Fig. 10 is a fragmentary sectional view taken along the line 10—10 of Fig. 2.

Fig. 11 is a fragmentary section taken on the line 11—11 in Fig. 7.

Figs. 12 and 13 are diagrammatic views showing one way in which the machine can be operated. In these views the machine may be considered as cutting either a room or an entry.

Figs. 14 and 15 are diagrammatic views showing another way in which the machine can be operated. In these views the machine is shown cutting according to the longwall method.

Figure 1:
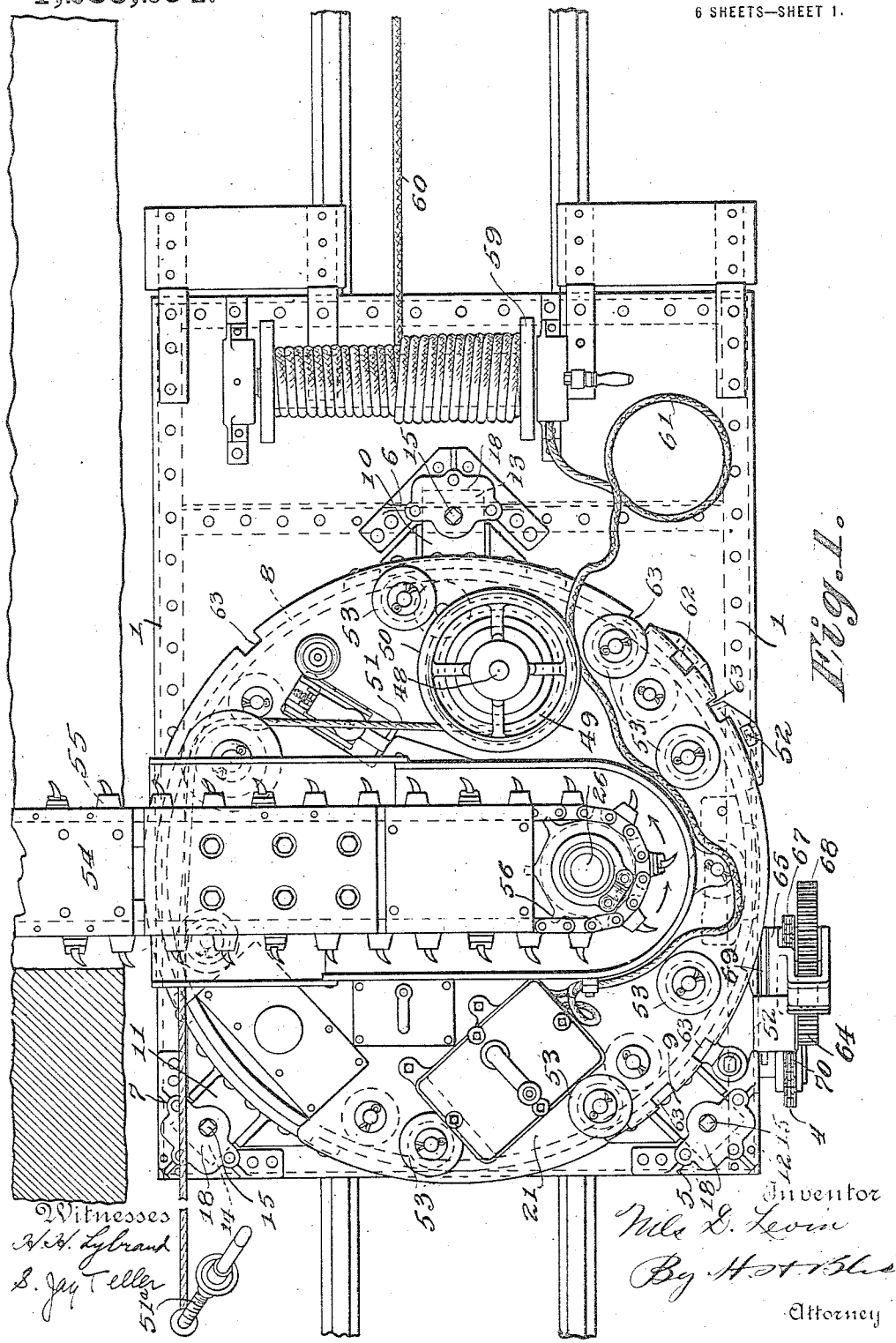
Figure 1 is a plan view of a machine embodying my invention in operative position in a mine.

Referring to the drawings, 1 represents the frame and platform of the truck which constitutes a rigid base upon which the other parts of the machine are mounted. The truck platform is supported on axles 2, $2^a$, and track wheel 3, $3^a$. One of the axles, as for instance 2, is extended at one end and carries a sprocket wheel 4, the purpose of which will be more fully described hereinafter.

At three separated points on the truck platform 1 are secured upright guides 5, 6 and 7, two of these guides being arranged at the front corners of the truck platform while the third is arranged centrally on the rear part of the platform. One of these guides is shown in vertical cross section in Fig. 6. 8 is an annular ring or frame to which the brackets or bosses 9, 10 and 11 are secured. The brackets 9, 10 and 11 are provided respectively with guide lugs 12, 13 and 14, which are positioned to engage with the upright guides 5, 6, and 7. Each of the lugs 12, 13 and 14 is provided with a vertical aperture through which extends an adjusting screw 15. The lower end of each adjusting screw 15 is provided with a hardened bearing pin 16 which rests upon and engages with a hardened bearing plate 17 secured to the truck platform 1. The upper end of each of the screws extends through and has a bearing in a plate 18 secured to the top of the corresponding vertical guide bracket. The extreme upper end of each screw is adapted to be engaged by a wrench, the screws being shown square in the drawings. On each of the screws 15 there is a threaded nut 19 which engages with and supports one of the lugs 12, 13 or 14. Each nut is held against rotation by means of a pin 20 which projects into a suitable aperture formed in the nut.

It will be observed that by the construction which I have described, the ring 8 is rigidly held against horizontal movement, but at the same time may be readily adjusted vertically by simply turning the screws 15 by means of their squared upper ends.

21 represents a turntable which rests upon the ring 8 and upon which are mounted the operative parts of the machine. The turntable 21 rests directly upon the upper surface of the ring and is guided and held against horizontal movement by means of rollers 22, 22, which engage with the inner surface of the ring. In order to prevent the turntable from being lifted away from the ring, the table is provided with depending clips 23 which engage with the under surface of the ring.

24 is an electric motor secured to the under side of the turntable. This motor is connected by means of suitable gearing with the main horizontal power shaft 25. 26 is a vertical power shaft operably connected with the shaft 25 by means of a bevel pinion 27 and a bevel gear 28. Meshing with the gear 28 is a second gear 29 which is mounted upon a horizontal shaft 30. The purpose of this shaft 30 will be more fully set forth hereinafter.

31 is a horizontal shaft mounted in suitable bearings on the under side of the turntable. This shaft 31 carries the ratchet wheel 32 near its center. Pivotally mounted at each side of the ratchet wheel 32 are arms 33 between which there is pivotally mounted a pawl 34 which is normally held in engagement with the ratchet wheel by means of a spring 35. The arms 33 are oscillated about their pivotal axis by means of the link 36 which is connected at one end to the arms by means of a knuckle joint, and at the other end to the strap 37 of an eccentric 38 which is mounted on the shaft 26, being preferably formed as a part of the gear 28. 39 is an arcuate finger mounted concentrically with the ratchet wheel 32 and adapted to be oscillated about the axis of the wheel by means of the threaded rod 40 and the hand wheel 41. 42 is a second pawl normally engaging the ratchet wheel 32. This pawl is held in place by means of the spring 43. The pawl 42 is preferably mounted upon an eccentric 44 keyed to a bolt 45 by means of which it can be rotated to throw the pawl into or out of operative position. The bolt 45 can be turned by means of a wrench.

In operation, when the shaft 26, together with the eccentric 38, is being continuously rotated, oscillatory movement is given to the arms 33 and the pawl 34, which movement is transmitted to the shaft 31 by means of the ratchet wheel. The finger 39 serves to hold the pawl out of engagement with the ratchet wheel during a part of its movement. By varying the position of the finger the pawl may be held inoperative during a greater or lesser part of its movement, and the rate of rotation of the ratchet wheel and the shaft 31 may in this way be regulated. The pawl 42 serves to prevent any retrograde movement of the ratchet wheel and the shaft.

Figure 2:
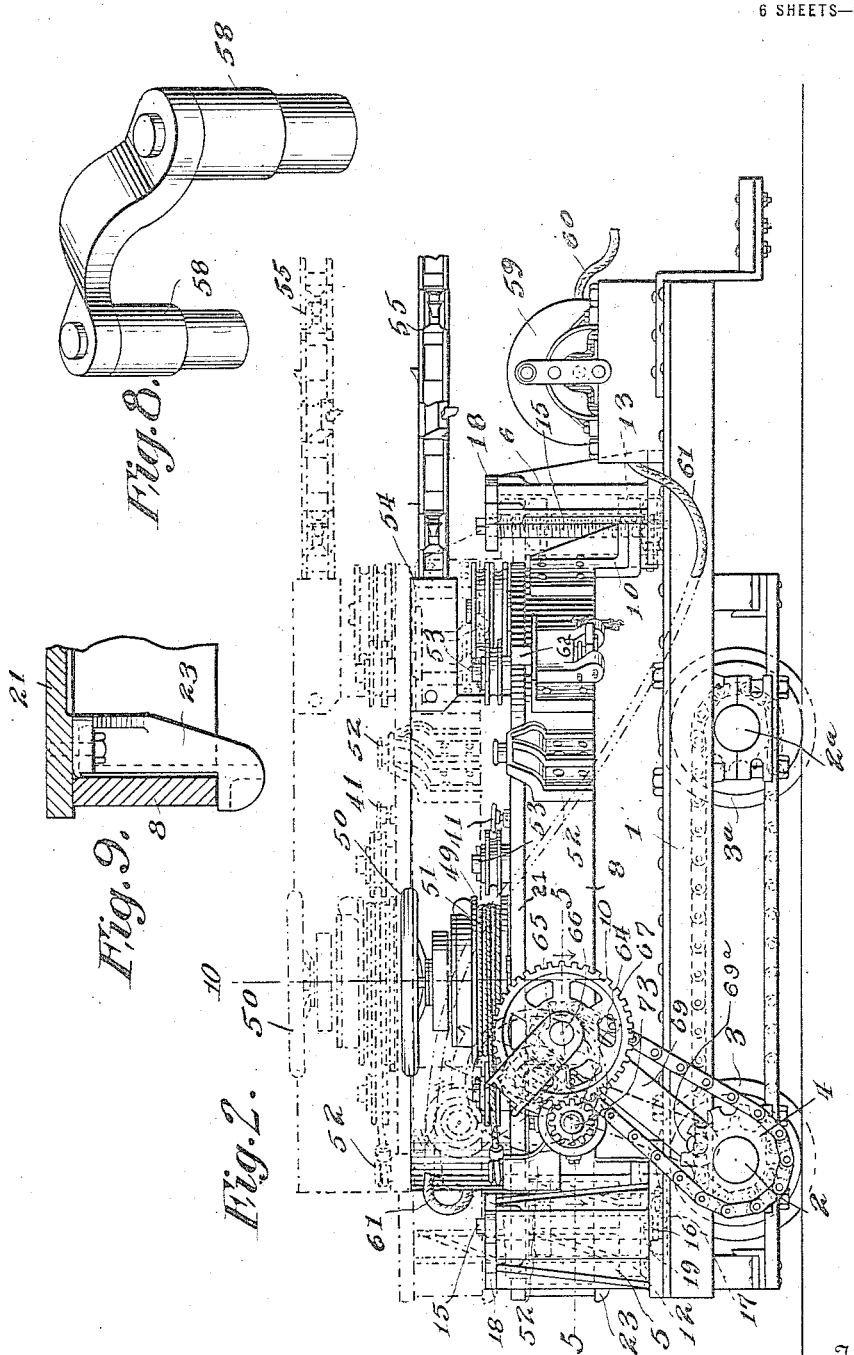
Fig. 2 is a side elevation showing a machine in two positions of adjustment.
Figure 3:
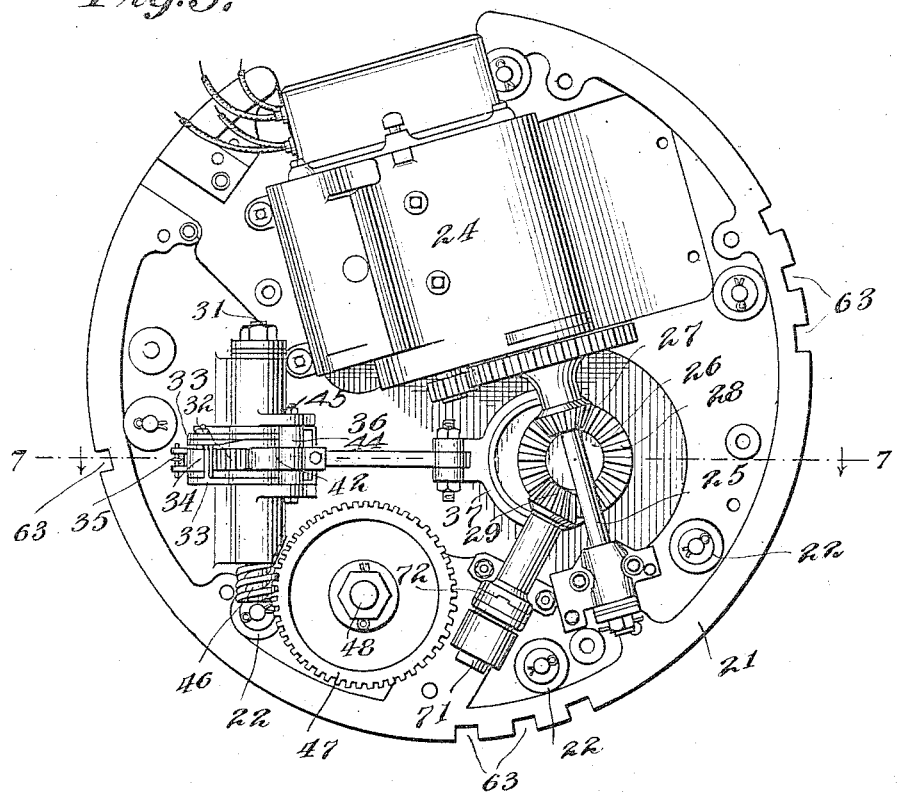
Fig. 3 is a bottom plan view of the turntable and attached mechanism separated from the other parts of the machine.
Figure 7:
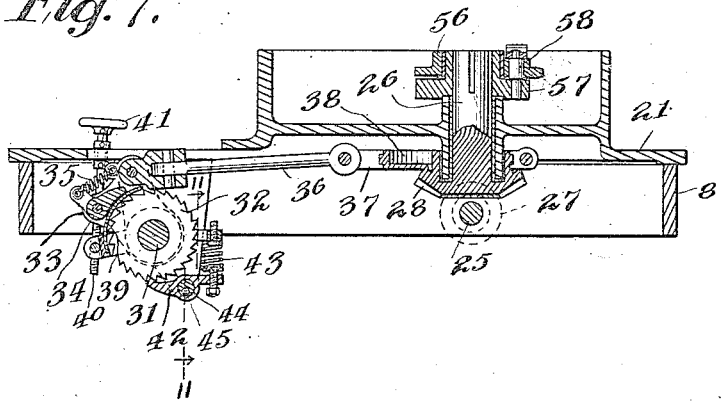
Fig. 7 is a fragmentary cross sectional view taken along the line 7—7 of Fig. 3, some of the parts being omitted for the sake of clearness.

The shaft 31 carries at one end a worm 46 which meshes with a worm wheel 47 on a vertical shaft 48. The shaft 48 carries at its upper end a winding drum 49 which is connected with the shaft, preferably by means of a friction clutch controlled by a hand wheel 50. 51 is a cable connected to the drum to be wound thereon. The end of this cable may be secured, as shown in Fig. 2, to one or another of the vertical studs or holders 52 which are provided on the ring 8. Horizontal idler sheaves 53 are arranged in a circumferential series around the turntable. Irrespective of which holder the end of the cable may be secured to, and irrespective of the position of the turntable, these sheaves 53 serve to guide the cable from the holder tangentially to the edge of the turntable, so that the draft of the cable is effectively applied to turn the table when the winding drum is rotated.

54 is a cutter arm projecting horizontally from the turntable 21 in planes above the other parts of the machine. 55 is a cutter chain which is suitably guided in the frame 54 and which passes at the inner end of the frame around a sprocket wheel 56 rotatably mounted concentrically with the shaft 26. Rigidly secured to the shaft 26 below the sprocket wheel 56 is a flange or collar 57. The sprocket wheel 56 and the flange 57 are each provided with two apertures which may be brought into alinement and through which may be passed the link connected pins 58, 58. When the pins 58, 58 are in place, power is transmitted from the shaft 26 to the sprocket wheel and to the cutter chain. When the pins are removed, the power connection to the cutter chain is broken and the shaft 26, together with all of the power mechanism, may be operated independently.

59 is an electric cable reel mounted on one end of the truck platform 1. Through the cable 60 wound upon this reel current may be supplied for operating the motor. The electrical connection between the reel and the motor is preferably formed by means of a flexible cable indicated by 61.

It is desirable in some cases to lock the cutter arm 54 against turning and effect the cutting of the kerf by moving the machine bodily. To this end I mount a locking bolt 62 on the frame 8 so that it can be raised and lowered into and out of engagement with any one of a number of notches 63 formed in the edge of the turntable.

Mechanism is provided for connecting the machine motor with the track wheels of the truck in order that the machine may be driven by its own power from point to point. Upon one of the brackets or lugs secured to the ring 8 as for instance 9, there is rotatably mounted a spur pinion 64 which has a central aperture provided with a keyway. (See Fig. 5). Alining apertures are also provided in the bracket 9 and in the ring 8. 65 is an arm mounted at one end on the bracket 9 concentrically with the spur pinion 64. The other end of the arm 65 is forked and between the forks there extends a horizontal pin 66. Rotatably mounted on the pin 66 is a sprocket wheel 67 upon the hub of which there is secured a spur gear 68 meshing with the spur pinion 64. 69 is a spacing strut pivotally mounted at its lower end on a bearing pin 69ª on the truck, and pivotally connected at its upper end to the pin 66. A chain 70 passes over the sprocket wheel 67 on the pin 66 and the sprocket wheel 4 on the axle 2. The strut 69 serves to hold the two sprocket wheels at the proper distance apart. Inasmuch as the strut 69 and the arm 65 are pivotally connected together and also pivoted respectively to the truck and to the ring, they automatically accommodate themselves as the ring is raised or lowered with respect to the truck, and there is corresponding accommodation of the power devices so that the power connection remains unbroken irrespective of the position of the ring.

Reference has heretofore been made to the shaft 30 which receives its power from the bevel gear 28 by means of the gear 29. At the other end of the shaft 30 there is provided a keyed socket 71 which is rotatably connected with the shaft by means of a compensating disk 72 which permits rotation of the shaft and of the socket about axes which are slightly out of alinement. When it is desired to drive the track wheels from the motor, the turntable is swung into the position shown in Fig. 2, and a pin 73 is inserted through the apertures in the spur pinion 64, the bracket 9 and the ring 8 into the socket 71. The pin 73 is provided at its forward end with a keyway adapted to be engaged by the key of the socket 71, and at its rear end with a key adapted to enter and engage the keyway of the pinion 64. When the pin 73 is in position, power is transmitted from the motor to the shaft 30, and from the shaft 30 through the compensating disk 72, the socket 71 and the pin 73 to the pinion 64. From the pinion 64 power is transmitted to the axle through the gear 68, the sprocket wheel 67, the chain 70 and the sprocket wheel 4. The compensating disk 72 serves to take care of any failure of the shaft 30 and of the pin 73 to come into exact axial alinement. In driving the machine through the train of power connections as has been described, it will ordinarily be found desirable to disconnect the cutter chain by removing the pins 58, 58.

The manner in which the machine operates will be understood from the foregoing description, and the way in which the machine is utilized in mining will be clear from a consideration of Figs. 12, 13, 14 and 15, which show two of the ways in which the machine can be used.

Referring first to Figs. 12 and 13, it will be observed that the machine is here shown as operating on a track which extends along the center of a room to the face which is to be cut. From the mine entry the machine, with the turntable and cutter arm arranged as shown in Fig. 2, advances under its own power into the room and is brought to a position as close as is convenient to the face of the coal. The pin 73 is now withdrawn to permit movement of the turntable and, the cutting mechanism having been extended toward the right as shown in Fig. 12, and having been adjusted to the proper working height, and if desired inclined to the horizontal, by means of the screws 15, the cable 51 is passed around the idler sheaves on the turntable and secured to one of the cable holders 52. The cutting mechanism and the winding drum are then set in motion, the rotation of the winding drum and consequent winding in of the cable serving to swing the cutting mechanism from right to left to cause it to cut a semicircular kerf extending from one side of the room to the other.

In Fig. 13 the kerf is shown half cut and the dotted lines indicate the position of the cutter after the completion of the cut.

The cut having been completed, the turntable and cutter arm are moved again to the position shown in Fig. 2, the pin 73 is replaced, so as to operatively connect the motor to the track wheels, and the machine is moved from the room under its own power, and thence through the mine entry to another room where the operation is repeated.

In Figs. 14 and 15 the machine is shown working on a track parallel to the coal face to be cut. The machine moves under its own power to the point where the cut is to be started and, the transmission pin 73 having been withdrawn, the cutter arm is brought into a position such as indicated by the dotted lines in Fig. 14. The cable 51 is then passed around the guide sheaves and secured to one of the holders 52 and the cutters and winding drum set in motion. The winding of the cable causes the cutter arm to swing from right to left from the position shown in dotted lines to that shown in full lines. When this full line position is reached, the feed is stopped and the cable is loosened, taken off from the holder 52 and extended along the face of the coal to a suitable jack 51ᵃ as indicated in Fig. 15 and also in Fig. 1. The cutter bar is then locked against swinging by means of the bolt 62 and the winding drum is again started. The draft of the cable now serves to draw the entire machine along the track, the cutters meanwhile forming the kerf. In Fig. 15 the dotted line showing indicates the position of the machine at the beginning of this movement along the track, while the full line showing indicates the machine after the cutting has progressed some distance. When the cut has been completed, if it is desired to remove the machine to another working place, the cutter arm is returned to the position shown in Fig. 2, the transmission pin 73 replaced and the machine driven over the tracks under its own power, as previously described.

By arranging the upright guides 5 and 7 and their associated supporting devices at the front corners of the truck platform, I secure a wide, firm support for the ring 8 and the turntable 21 at points as close as possible to the face of the coal.

While I prefer a construction, such as has been set forth, in which the horizontally turning frame which carries the cutting mechanism is in the form of a turntable mounted to turn about a fixed axis, it will be understood that my invention is not limited to a frame that turns about a fixed axis, and the term "turntable" which I employ in describing the invention is to be construed accordingly.

What I claim is:

1. In a coal cutting machine, the combination of a truck provided with axles and track wheels, a frame vertically adjustable with respect to the truck, horizontally extending cutting mechanism on the frame, a motor carried by the frame for driving the cutting mechanism, and power connections between the motor and one of the axles of the truck, the said power connections being automatically adjustable to be operable irrespectively of the vertical position of the frame with respect to the truck.

2. In a coal cutting machine, the combination of a truck provided with axles and track wheels, a frame vertically adjustable with respect to the truck, horizontally extending cutting mechanism on the frame, a motor carried by the frame for driving the cutting mechanism, a power element on the frame rotatable about a horizontal axis and operably connected with the motor, a movable power element rotatable about a horizontal axis, and connected with the first power element, an arm for holding the movable power element at a uniform distance from the first power element, an arm for holding the movable power element at a uniform distance from one of the axles, and means for connecting the movable power element with the said axle.

3. In a coal cutting machine, the combination of a truck provided with axles and track wheels, a frame vertically adjustable with respect to the truck, horizontally extending cutting mechanism on the frame, a motor carried by the frame for driving the cutting mechanism, a pinion connected with the motor and mounted for rotation about a transverse horizontal axis, an arm pivotally mounted at one end concentrically with the pinion, a gear rotatably mounted at the other end of the arm and meshing with the pinion, a sprocket wheel secured to the gear to rotate therewith, a strut connected at one end to one of the axles and at its other end to the free end of the arm, a sprocket wheel on the said axle, and a chain passing over the two said sprocket wheels.

4. In a coal cutting machine, the combination of a truck provided with axles and track wheels, a frame mounted on the truck, a turn table rotatably mounted with respect to the frame, horizontally extending cutting mechanism on the turn table, a motor on the turn table connected with the cutting mechanism, power transmitting mechanism operatively connected to one of the truck axles and mounted in part upon the frame, and means for operably connecting the motor with the said power transmitting mechanism when the turn table is in one position.

5. In a coal cutting machine, the combination of a truck provided with axles and track wheels, a frame mounted on the truck and vertically adjustable with respect thereto, a turn table rotatably mounted on the frame, a horizontally extending cutting mechanism on the turn table, a motor on the turn table connected with the cutting mechanism to drive it, a power transmitting mechanism connected to one of the axles of the truck and mounted in part on the frame, the said power transmitting mechanism being operable irrespective of the position of the frame with respect to the truck, and means for connecting the motor to the power transmitting mechanism when the turn table is in one position.

6. In a coal cutting machine, the combination of a truck provided with axles and track wheels, a frame vertically adjustable with respect to the truck, a turn table mounted on the frame, horizontally extending cutting mechanism mounted on the turn table, a motor on the turn table for driving the cutting mechanism, power transmitting mechanism connected to one of the axles of the truck and having a rotatable element mounted on the frame, the power transmitting mechanism being automatically adjustable to be operable for all positions of the frame, a rotatable element connected with the motor and adapted to substantially aline with the rotating element on the frame, when the turn table is in one position, and means for connecting together at will the two rotatable elements.

7. In a coal cutting machine, the combination of a truck provided with axles and track wheels, a frame vertically adjustable with respect to the truck, a turn table mounted on the frame, horizontally extending cutting mechanism mounted on the turn table, a motor on the turn table for driving the cutting mechanism, power transmitting mechanism connected to one of the axles of the truck and having a rotatable element mounted on the frame, the power transmitting mechanism being automatically adjustable to be operable for all positions of the frame, a rotatable element connected with the motor and adapted to aline with the rotating element on the frame when the turn table is in one position, and means for connecting together at will the two rotatable elements, the said means comprising a device adapted to transmit power irrespective of whether or not the two elements are in exact axial alinement.

8. In a coal cutting machine, the combination of a truck provided with axles and track wheels, a frame vertically adjustable with respect to the truck, a turn table mounted on the frame, horizontally extending cutting mechanism mounted on the turn table, a motor on the turn table for driving the cutting mechanism, power transmitting mechanism connected to one of the axles of the truck and having a centrally apertured rotatable element mounted on the frame, the said power transmitting mechanism being automatically adjustable to be operable irrespectively of the position of the frame, a rotating socket mounted on the turn table and connected with the motor, the said socket being adapted to substantially aline with the apertured rotatable elements when the turn table is in one position, and a pin adapted to extend through the apertured element and into the socket and to engage the apertured element and the socket to transmit power from the latter to the former.

9. In a coal cutting machine, the combination of a truck provided with axles and track wheels, a frame vertically adjustable with respect to the truck, a turn table mounted on the frame, horizontally extending cutting mechanism mounted on the turn table, a motor on the turn table for driving the cutting mechanism, power transmitting mechanism connected to one of the axles of the truck and having a centrally apertured rotatable element mounted on the frame, the said power transmitting mechanism being automatically adjustable to be operable irrespectively of the position of the frame, a rotating socket mounted on the turn table, the said socket being adapted to substantially aline with the apertured rotatable element when the turn table is in one position, means for connecting the motor with the socket in a manner permitting the position of the axis of rotation of the socket to vary, and a pin adapted to extend through the apertured element and into the socket and to engage the apertured element and the socket to transmit power from the latter to the former.

10. In a coal cutting machine, the combination of a rigid framework, track wheels supporting said framework, a turn table mounted on the framework, horizontally extending cutting mechanism mounted on the turn table, a motor on the turn table for driving the cutting mechanism, power transmitting mechanism connected to the track wheels and comprising a rotatable element mounted on the framework, a rotatable element connected with the motor and adapted, when the table is turned, to move into and out of approximate axial alinement with the rotatable element on the framework, and means adapted to operatively connect the said rotatable elements when they are in alinement.

11. In a coal cutting mechanism, the combination of a rigid framework, track wheels supporting said framework, a turn table mounted on the framework, horizontally extending cutting mechanism mounted on the turn table, a driving motor on the turn table, power transmitting mechanism connected to the track wheels and comprising a rotatable element mounted on the said framework, a rotatable element connected with the motor and adapted, when the table is turned, to move into and out of approximate axial alinement with the rotatable element on the framework, and means adapted to operatively connect the said rotatable elements when they are in alinement.

In testimony whereof I affix my signature in presence of two witnesses.

NILS DAVID LEVIN.

Witnesses:
E. E. ROCKFIELD,
DUDLEY T. FISHER.